US009269158B2

(12) United States Patent
Ukil et al.

(10) Patent No.: US 9,269,158 B2
(45) Date of Patent: Feb. 23, 2016

(54) METHOD, APPARATUS AND COMPUTER PROGRAM PRODUCT FOR PERIODIC MOTION DETECTION IN MULTIMEDIA CONTENT

(71) Applicant: Nokia Corporation, Espoo (FI)

(72) Inventors: Soumik Ukil, Bangalore (IN); Krishna Annasagar Govindarao, Bangalore (IN); Ravi Shenoy, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 168 days.

(21) Appl. No.: 14/028,748

(22) Filed: Sep. 17, 2013

(65) Prior Publication Data
US 2014/0086452 A1 Mar. 27, 2014

(30) Foreign Application Priority Data

Sep. 25, 2012 (IN) ............................ 3973/CHE/2012

(51) Int. Cl.
G06T 7/20 (2006.01)
(52) U.S. Cl.
CPC .......... G06T 7/20 (2013.01); G06T 2207/10016 (2013.01); G06T 2207/20068 (2013.01)
(58) Field of Classification Search
None
See application file for complete search history.

(56) References Cited

U.S. PATENT DOCUMENTS

| 5,745,384 | A | * | 4/1998 | Lanzerotti | G01V 1/008 324/323 |
| 6,381,365 | B2 | | 4/2002 | Murakawa | |
| 7,674,967 | B2 | | 3/2010 | Makino | |
| 8,131,050 | B2 | | 3/2012 | Tamai et al. | |
| 8,730,246 | B2 | * | 5/2014 | Girard | 345/474 |
| 2004/0066981 | A1 | * | 4/2004 | Li | G06T 7/0083 382/286 |
| 2004/0120554 | A1 | * | 6/2004 | Lin | G06K 9/00335 382/118 |
| 2007/0296833 | A1 | * | 12/2007 | Corcoran | H04N 5/23248 348/231.99 |
| 2008/0273039 | A1 | * | 11/2008 | Girard | G06T 13/40 345/475 |
| 2009/0162186 | A1 | * | 6/2009 | Christinsen | G01H 1/06 415/1 |
| 2010/0191722 | A1 | * | 7/2010 | Boiman | G06F 17/30787 707/723 |

FOREIGN PATENT DOCUMENTS

| CN | 101898319 | A | * | 12/2010 |
| CN | 102281385 | A | | 12/2011 |
| EP | 0973341 | A2 | | 1/2000 |

(Continued)

OTHER PUBLICATIONS

Elfeky et al., "WARP: Time Warping for Periodicity Detection", IEEE International Conference on Data Mining, Nov. 27-30, 2005, 8 pages.

(Continued)

Primary Examiner — Tsung-Yin Tsai
(74) Attorney, Agent, or Firm — Nokia Technologies Oy

(57) ABSTRACT

In an example embodiment a method, apparatus and computer program product are provided. The method includes facilitating selection of a region of interest (ROI) in a plurality of frames of a multimedia content. The ROI is associated with a motion of at least one object. An object mobility data matrix associated with the ROI is determined in the plurality of frames. The object mobility data matrix is indicative of a difference in motion of the at least one object in the plurality of frames. A projection of the object mobility data matrix is determined on a line. The motion of the at least one object in the ROI is determined across the plurality of frames to as a periodic motion or a non-periodic motion based on the projection of the object mobility data matrix.

17 Claims, 9 Drawing Sheets

(56) References Cited

FOREIGN PATENT DOCUMENTS

| JP | 58-105664 A | 6/1983 |
| WO | 2006/124406 A2 | 11/2006 |
| WO | 2008/039401 A2 | 4/2008 |

OTHER PUBLICATIONS

Briassouli et al., "Extraction and Analysis of Multiple Periodic Motions in Video Sequences", IEEE Transactions on Pattern Analysis and Machine Intelligence, vol. 29, Issue 7, Jul. 2007, pp. 1244-1261.

Cutler et al., "Robust Real Time Periodic Motion Detection, Analysis and Applications", IEEE Transactions on Pattern Analysis and Machine Intelligence, vol. 22, Issue 8, Aug. 2000, pp. 781-796.

Tong et al., "Periodicity Detection of Local Motion", IEEE International Conference on Multimedia and Expo, Jul. 6, 2005, 5 pages.

Rabiner et al., "Digital Processing of Speech Signals", Edition 1, Sep. 5, 1978, 512 pages.

Bogert et al., "The Quefrency Analysis of Time Series for Echoes: Cepstrum, Pseudo-Autocovariance, Cross-Cepstrum, and Saphe Cracking", In Proceedings of the Symposium on Time Series Analysis, 1963, pp. 209-243.

\* cited by examiner

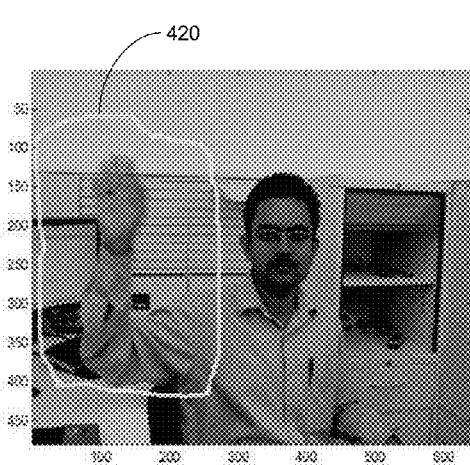 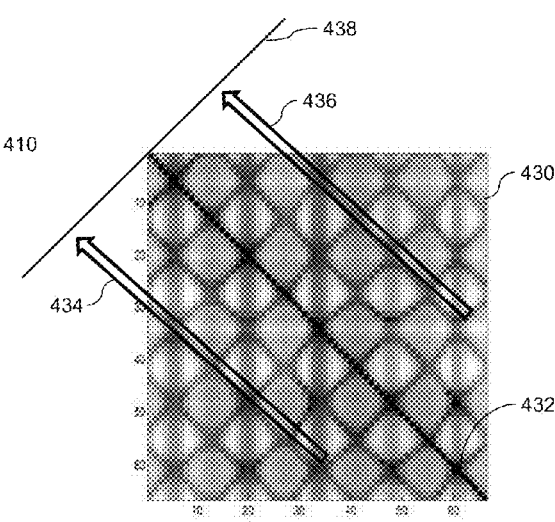
FIGURE 4A                                                FIGURE 4B

METHOD, APPARATUS AND COMPUTER PROGRAM PRODUCT FOR PERIODIC MOTION DETECTION IN MULTIMEDIA CONTENT

TECHNICAL FIELD

Various implementations relate generally to method, apparatus, and computer program product for detection of a periodic motion in multimedia content.

BACKGROUND

In recent years, various techniques have been developed for digitization and further processing of multimedia content. Examples of multimedia content may include, but are not limited to a video of a movie, a video shot, and the like. The digitization of the multimedia content facilitates in complex manipulation of the multimedia content for enhancing user experience with the digitized multimedia content. For example, the multimedia content may be manipulated and processed for generating animated images that may be utilized in a wide variety of applications. Animated images include a series of images encapsulated within an image file. The series of images may be displayed in a sequence, thereby creating an illusion of movement of objects in the animated image.

SUMMARY OF SOME EMBODIMENTS

Various aspects of examples embodiments are set out in the claims.

In a first aspect, there is provided a method comprising: facilitating selection of a region of interest (ROI) in a plurality of frames of a multimedia content, the ROI associated with a motion of at least one object; determining an object mobility data matrix associated with the ROI in the plurality of frames, the object mobility data matrix being indicative of a difference in motion of the at least one object in the plurality of frames; determining a projection of the object mobility data matrix on a line; and determining the motion of the at least one object in the ROI across the plurality of frames as a periodic motion or a non-periodic motion based on the projection of the object mobility data matrix.

In a second aspect, there is provided an apparatus comprising at least one processor; and at least one memory comprising computer program code, the at least one memory and the computer program code configured to, with the at least one processor, cause the apparatus to perform at least: facilitate selection of a ROI in a plurality of frames of a multimedia content, the ROI associated with a motion of at least one object; determine an object mobility data matrix associated with the ROI in the plurality of frames, the object mobility data matrix being indicative of a difference in motion of the at least one object in the plurality of frames; determine a projection of the object mobility data matrix on a line; and determine the motion of the at least one object in the ROI across the plurality of frames as a periodic motion or a non-periodic motion based on the projection of the object mobility data matrix.

In a third aspect, there is provided a computer program product comprising at least one computer-readable storage medium, the computer-readable storage medium comprising a set of instructions, which, when executed by one or more processors, cause an apparatus to perform at least: facilitate selection of a ROI in a plurality of frames of a multimedia content, the ROI associated with a motion of at least one object; determine an object mobility data matrix associated with the ROI in the plurality of frames, the object mobility data matrix being indicative of a difference in motion of the at least one object in the plurality of frames; determine a projection of the object mobility data matrix on a line; and determine the motion of the at least one object in the ROI across the plurality of frames as a periodic motion or a non-periodic motion based on the projection of the object mobility data matrix.

In a fourth aspect, there is provided an apparatus comprising: means for accessing a set of feature points in a first frame of a content, wherein the first frame selected from a plurality of frames of the content; means for facilitating selection of a ROI in a plurality of frames of a multimedia content, the ROI associated with a motion of at least one object; means for determining an object mobility data matrix associated with the ROI in the plurality of frames, the object mobility data matrix being indicative of a difference in motion of the at least one object in the plurality of frames; means for determining a projection of the object mobility data matrix on a line; and means for determining the motion of the at least one object in the ROI across the plurality of frames as a periodic motion or a non-periodic motion based on the projection of the object mobility data matrix.

In a fifth aspect, there is provided a computer program comprising program instructions which when executed by an apparatus, cause the apparatus to: facilitate selection of a ROI in a plurality of frames of a multimedia content, the ROI associated with a motion of at least one object; determine an object mobility data matrix associated with the ROI in the plurality of frames, the object mobility data matrix being indicative of a difference in motion of the at least one object in the plurality of frames; determine a projection of the object mobility data matrix on a line; and determine the motion of the at least one object in the ROI across the plurality of frames as a periodic motion or a non-periodic motion based on the projection of the object mobility data matrix.

BRIEF DESCRIPTION OF THE FIGURES

Various embodiments are illustrated by way of example, and not by way of limitation, in the figures of the accompanying drawings in which:

FIGS. 4A, 4B, 4C and 4D illustrate an example representation of steps for determination of a periodic motion in a multimedia content, in accordance with an example embodiment;

DETAILED DESCRIPTION

Example embodiments and their potential effects are understood by referring to FIGS. 1 through 7 of the drawings.

Figure 1:
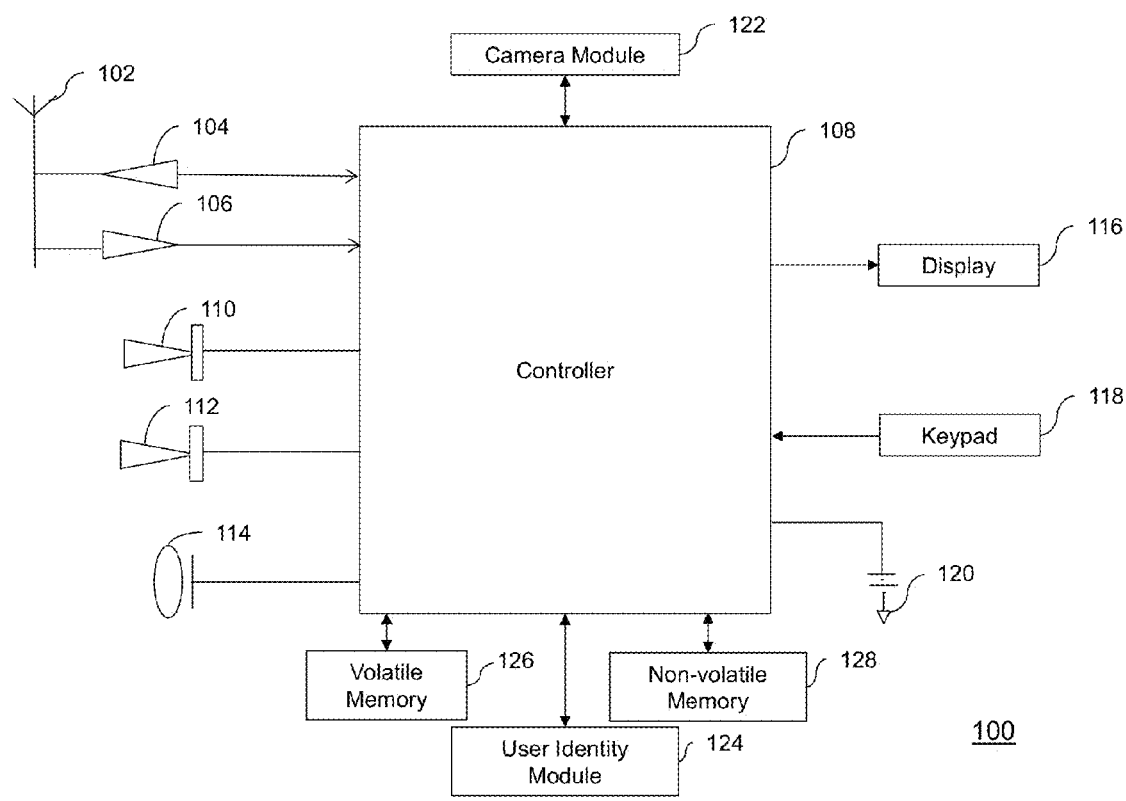
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
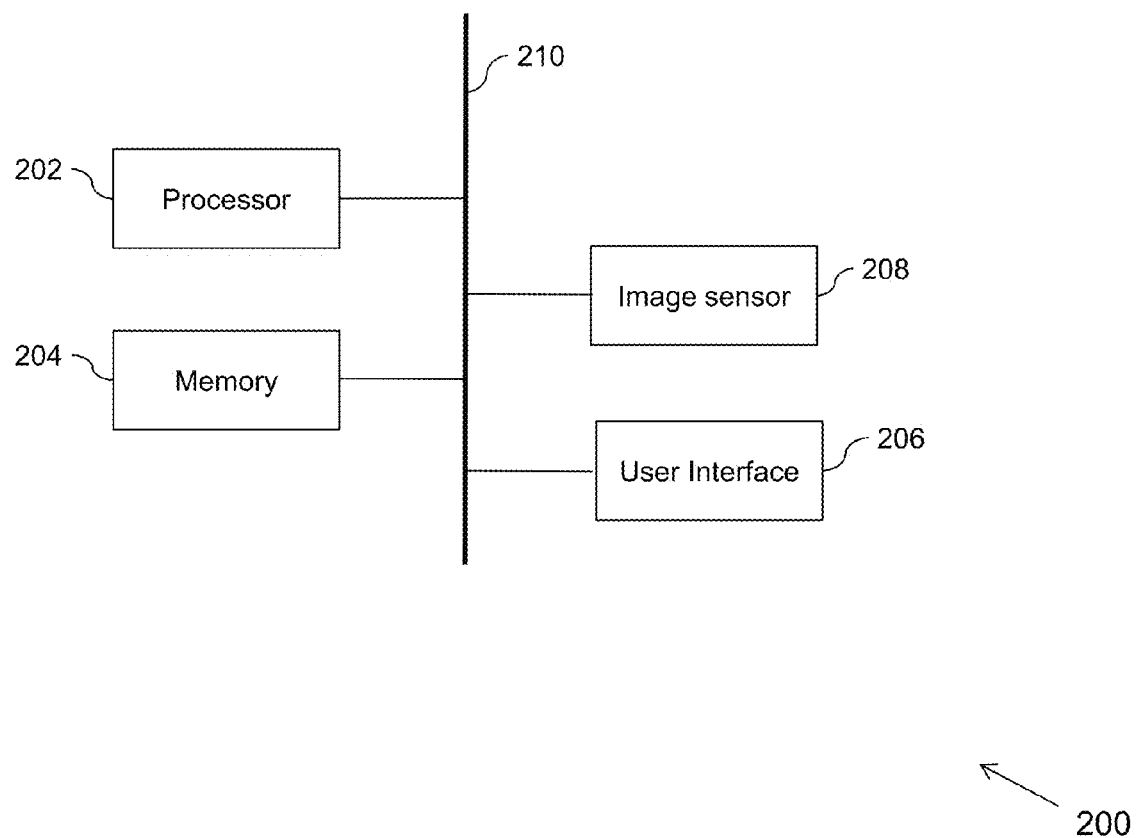
FIG. 2 illustrates an apparatus for detection of a periodic motion in multimedia content in accordance with an example embodiment.

FIG. 2 illustrates an apparatus 200 for detection of a periodic motion in a multimedia content, in accordance with an example embodiment. In various example embodiments, the apparatus 200 is configured to generate animated images from a plurality of frames associated with the multimedia content. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the electronic may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100.

These components (202-208) may communicate to each other via a centralized circuit system 210 to perform estimation/computation of image parameters. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 200 is configured to, with the content of the memory 204, and optionally with other components described herein, to cause the apparatus 200 to receive a sequence of frames associated with a multimedia content. In an embodiment, the multimedia content may pertain to a scene. In an embodiment, the multimedia content may be captured by displacing the apparatus 200 in at least one direction. For example, the apparatus 200 such as a camera may be moved around the scene either from left direction to right direction, or from right direction to left direction, or from top direction to a bottom direction, or from bottom direction to top direction, and so on. In some embodiments, the apparatus 200 may be configured to determine a direction of movement at least in parts and under some circumstances automatically, and provide guidance to a user to move the apparatus 200 in the determined direction. In an embodiment, the apparatus 200 may be an example of a media capturing device, for example, a camera. In some embodiments, the apparatus 200 may include a position sensor for guiding movement of the apparatus 200 to determine direction of movement of the apparatus for capturing the multimedia content.

In an example embodiment, the multimedia content may include a plurality of frames captured for the purposes of generating an animated image. In an example embodiment, the image sensor 208 may be configured to capture the video content or the plurality of frames. In some example embodiments, the multimedia content may be prerecorded, stored in an apparatus 200, or may be received from sources external to the apparatus 200. In such example embodiments, the apparatus 200 is caused to receive the content from external storage medium such as DVD, Compact Disk (CD), flash drive, memory card, or received from external storage locations through Internet, Bluetooth®, and the like.

In an embodiment, the plurality of frames of the multimedia content may include a scene comprising one of a periodic motion (repetitive motion) or a non-repetitive motion. For example, the multimedia content may include a scene of an elephant wagging her tail in a to-and-fro direction. In this scene, the motion of the tail may be construed as a periodic motion. As used herein, the term periodic motion or periodicity of motion may be referred to as an oscillatory motion about a fixed position. In an embodiment, the periodicity of motion may be determined in the multimedia content, so that the periodic motion may be played repeated, and accordingly facilitating in creating an endlessly looping, temporally seamless animated image.

In an embodiment, for determination of the periodic motion in a multimedia content, a pre-processing may be performed to remove any effects of other motions such as translational motion that may superimpose the periodic motion. For example, the elephant walking while wagging her tail may include a translational motion (for example, walking) and a periodic motion (for example, wagging of the tail). In an embodiment, the pre-processing may include aligning the plurality of frames such that the moving objects may be localized, and caused to be at almost a same position in each frame before being correlated to detect the periodic motion. In an example embodiment, the processor 200 is configured to, with the content of the memory 204, and optionally with other components described herein, to cause the apparatus 200 to perform pre-processing of the multimedia content. In an example embodiment, a processing means may be configured to perform pre-processing of the multimedia content. An example of the processing means may include the processor 202, which may be an example of the controller 108.

In an embodiment, the pre-processing of the multimedia content may generate a plurality of frames of the multimedia content comprising motion of at least one object. In an example embodiment, the processor 200 is configured to, with the content of the memory 204, and optionally with other components described herein, to cause the apparatus 200 to facilitate selection of a ROI in the plurality of frames of the multimedia content, such that the ROI comprises at least one object in motion. In an embodiment, the selection of the ROI is performed by a user action. In an embodiment, the user action may include a mouse click, a touch on a display of the user interface, a gesture of a user such as a hand gesture, a gaze of the user, and the like. In an embodiment, the selected at least one object may appear highlighted on the user interface. In an example embodiment, a processing means may be configured to facilitate selection of the ROI in the plurality of frames of a multimedia content. An example of the processing means may include the processor 202, which may be an example of the controller 108.

In an example embodiment, the processor 200 is configured to, with the content of the memory 204, and optionally with other components described herein, to cause the apparatus 200 to determine an object mobility data matrix associated with the ROI in the plurality of frames. In an embodiment, the object mobility data matrix is indicative of a difference in motion of the at least one object in the plurality of frames. In an embodiment, the object mobility data matrix may be determined by computing a sum of absolute differences (SAD) between the plurality of frames. In an embodiment, on selection of the ROI in the plurality of frames, the object mobility data matrix may be determined by determining the pixels within the ROI such that D(i,j)=SAD (framei, framej), wherein framei, framej are the pixels within the ROI in frames i and j, respectively.

In an example embodiment, if there are N frames, then the object mobility data matrix may be an N×N matrix. Example of object mobility data matrices are illustrated and described in detail in FIGS. 4B and 5B. The object mobility data matrix represents difference or disparity between the frames. In an embodiment, the frames may be represented as a low-cost line in the object mobility data matrix such that the low-cost line may be aligned to one of the diagonals of the object mobility data matrix. In an embodiment, the low cost line (or sub-diagonals) may be parallel to and at equal distance from the main diagonal of the object mobility data matrix.

In an embodiment, for determination of the periodic motion in the multimedia content, the sub-diagonals of the object mobility data matrix may be analyzed. In an embodiment, the periodic motion may be detected by projecting the object mobility data matrix on a line. In an example embodiment, the processor 200 is configured to, with the content of the memory 204, and optionally with other components described herein, to cause the apparatus 200 to determine a projection of the object mobility data matrix on the line. In an embodiment, the line may be orthogonal to a diagonal of the object mobility data matrix. In an embodiment, the sub-diagonals corresponding to the periodic shifts in the plurality of frames may be aligned at an angle of 45 degrees, therefore a projection of the object mobility data matrix along a line orthogonal to the diagonal may represent the periodic motion of the ROI. In an embodiment, the projection of the object mobility data matrix along 45 degrees may be of a length of 2N+1, wherein N is the number of frames. Such a projection of the object mobility data matrix along 45 degrees is described in more detail with reference to FIGS. 4C and 5C. In an embodiment, a frequency domain analysis may be performed on the determined projection to robustly estimate whether the plurality of frames associated with the ROI is periodic. Additionally, the duration of the period may be determined based on the frequency analysis of the projected signal.

In an example embodiment, the processor 200 is configured to, with the content of the memory 204, and optionally with other components described herein, to cause the apparatus 200 to determine the motion of the at least one object in the ROI across the plurality of frames as a periodic motion or a non-periodic motion based on the projection of the object mobility data matrix. In an embodiment, the motion is determined to be one of the periodic motion and the non-periodic motion based on a computation of a cepstrum. The cepstrum of an image or the frame may be defined as an inverse Fourier transform of the logarithm of the spectral power of the image or the frame. The cepstrum may be expressed in terms of the following expression:

$$C(q) = IFFT(\log(abs(FFT(x[n]))))$$

The x-axis in the cepstrum is referred to as quefrency. The quefrency may be construed as an inverse of frequency. In an embodiment, the quefrency may be utilized for indicating a period of motion associated with the ROI. In an embodiment, when the ROI of the multimedia content is periodic, the one dimensional projection of the object mobility data matrix along 45 degrees can be represented as a filtered periodic-impulse-train. It will be understood that on filtering a periodic impulse train by a filter (such as a low pass filter), the period of the impulse train may be observed as a spike in the cepstrum. Additionally, the peak in the cepstrum corresponds to the period of the periodic impulse train. Moreover, the periodicity in the impulse train may be represented as a spike (or a peak) at a value of quefrency corresponding to the period of the impulse train. In an embodiment, the cepstrum may estimate the periodic motion based on the filtering of a periodic impulse train by a slowly varying filter. The cepstrum for the projection is explained further in detail with reference to FIG. 4D.

In an embodiment, the filtered periodic-impulse-train may be analyzed by utilizing the cepstrum since the projection of the sub-diagonal at the integer multiples of the period has very low SAD. In an embodiment, for determination of the periodicity based on the cepstrum, a presence of at least one peak in the computed cepstrum having amplitude greater than a predetermined threshold amplitude, and a quefrency greater than a predetermined threshold quefrency are determined. In an embodiment, the predetermined threshold quefrency may be a value of quefrency above which a first peak of the cepstrum occurs. In an embodiment, the value of the quefrency above the predetermined threshold quefrency at which a peak of the cepstrum appears may correspond to a period of the periodic motion. In an embodiment, the period of motion may correspond to a value of quefrency at which a peak of at least one peak occurs in the computed cepstrum such that the amplitude at the peak is greater than the predetermined threshold amplitude, and the quefrency is greater than the predetermined threshold quefrency. In an embodiment, the peak may be a first occurring peak in the computed cepstrum having the amplitude greater than the predetermined threshold amplitude, and the quefrency greater than the predetermined threshold quefrency. In this embodiment, the value of quefrency at the peak may be Qfrency1. In this embodiment, the value of Qfrency1 may be the period of the periodic motion. In another embodiment, the peak may be a peak occurring at a second or third instance or any other instance apart from the first instance at which the amplitude is greater than the predetermined threshold amplitude, and the quefrency is greater than the predetermined threshold quefrency. In this embodiment, the value of quefrency (Qfrency2) at, for example, the second peak may be 2*Qfrency1. In this embodiment, the value of Qfrency2 may be the period of the periodic motion. In an embodiment, the processor 200 is configured to, with the content of the memory 204, and optionally with other components described herein, to cause the apparatus 200 to determine the period of the ROI on a determination of the motion to be the periodic motion.

In an example embodiment, the processor 200 is configured to, with the content of the memory 204, and optionally with other components described herein, to cause the apparatus 200 to determine the presence of one of the periodic motion and the non-periodic motion in the multimedia content based on the amplitude and the determined quefrency of the cepstrum. In an example embodiment, a processing means may be configured to determine the presence of the periodicity in the multimedia content based on the amplitude and quefrency of the cepstrum. An example of the processing means may include the processor 202, which may be an example of the controller 108.

In an embodiment, on determination of the presence of at least one peak in the computed cepstrum having an amplitude greater than the predetermined threshold amplitude, and the quefrency being greater than the predetermined threshold quefrency may determine the presence of the periodic motion in the ROI of the multimedia content. In an alternate embodiment, an absence of at least one peak in the computed cepstrum having an amplitude greater than the predetermined threshold amplitude, and the quefrency being lower than the predetermined threshold quefrency may ascertain the absence of the periodicity in the ROI of the multimedia content.

As discussed, the periodic motion of the ROI may be detected based on a determination of at least one peak in the cepstrum. In various example embodiments, however, based on an application, the periodic motion of the ROI may be detected based on a determination of a predetermined threshold number of peaks for ascertaining the presence of the periodic motion. For example, in case of generation of an animated image, at least four peaks in the cepstrum of the analyzed plurality of frames may be determined for facilitating composition of a meaningful animated image.

In an example embodiment, a processing means may be configured to: facilitate selection of a ROI in a plurality of frames of a multimedia content, the ROI associated with a motion of at least one object; determine an object mobility data matrix associated with the ROI in the plurality of frames, the object mobility data matrix being indicative of a difference in motion of the at least one object in the plurality of frames; determining a projection of the object mobility data matrix on a line; and determine the motion of the at least one object in the ROI across the plurality of frames as a periodic motion or a non-periodic motion based on the projection of the object mobility data matrix. Such means may be configured by utilizing hardware, firmware and software components. Examples of such means may include, but are not limited to, the processor 202 along with the memory 204, the UI 206, the image sensor 208.

Figure 3A:
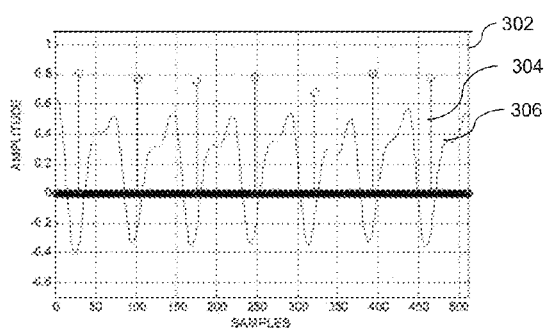
FIGS. 3A and 3B illustrate example graphical representation of steps for detection of periodic motion in a multimedia content, in accordance with an example embodiment.
Figure 3B:
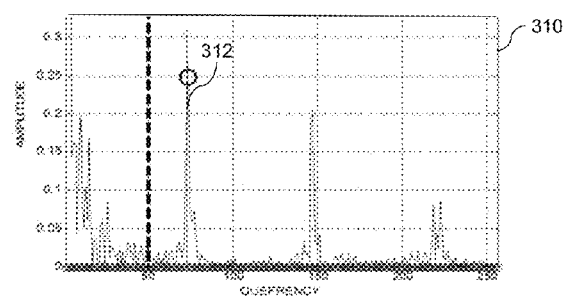

FIGS. 3A and 3B illustrate example graphical representation of steps for detection of the periodic motion in a multimedia content, in accordance with an example embodiment. For example, FIG. 3A illustrates a variation of number of samples versus amplitude for a periodic impulse train and a filtered impulse train, and FIG. 3B illustrates an example cepstrum that may be utilized for detection of periodic motion in the multimedia content. Referring to FIG. 3A, the variation 302 comprises the number of samples on x-axis and the amplitude on y-axis. The variation illustrates an example periodic impulse (unfiltered) signal 304 and a corresponding filtered signal 306. In an embodiment, the periodic impulse signal 304 may be filtered by a filter such as a low pass filter to generate the filtered signal 306. In an embodiment, the cepstrum may estimate the periodicity based on an assumption of filtering the periodic impulse signal 304 by a slowly varying filter.

Referring to FIG. 3B, a cepstrum 310 is illustrated. The x-axis of the cepstrum 310 may represent quefrency. The term quefrency may be construed as an inverse of frequency. In an embodiment, the quefrency may be used to indicate the periodicity in the impulse signal. In an embodiment, when the filter is stationary over the plurality of frames, the cepstrum de-convolves the filter response from the periodic impulse train. In an embodiment, the filter is assumed to be stationary over the observation time frame, and as such, the cepstral coefficients corresponding to the filter are concentrated near the origin, for example at lower values of quefrency. In an embodiment, when a periodic impulse signal is filtered by a filter, the period of the signal may be determined as a spike (or the peak) in the cepstrum. In an embodiment, the periodicity in the impulse signal may be seen as a spike at a value of quefrency corresponding to the period of the impulse signal. For example, as shown in FIG. 3B illustrating the cepstrum 310, the value of quefrency at a peak 312 in the cepstrum 310 corresponds to a period of the periodic impulse signal.

Figure 4C:
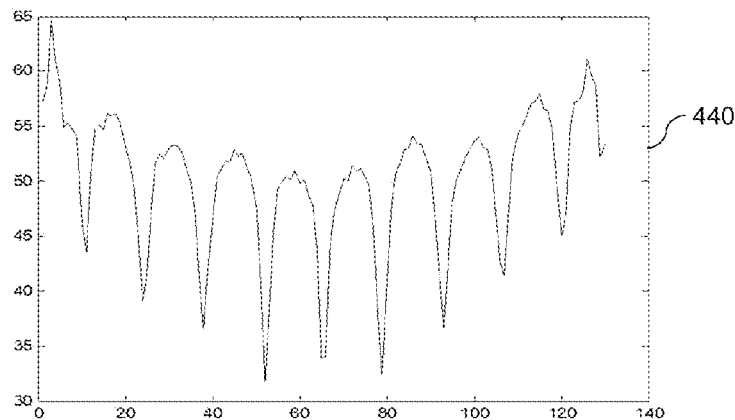

FIGS. 4A, 4B, 4C and 4D illustrate determination of periodicity in a periodic multimedia content in accordance with an example embodiment. FIG. 4A illustrates an example frame 410 of a multimedia content showing an ROI, in accordance with an example embodiment. The frame 410 may be a selected as a first frame of a content, and remaining frames of the content may be aligned to the frame 410 to generate an animated image. A ROI is also represented in the FIG. 4A that encompass a dynamic part (region of the frame 410 that is in motion in the succeeding frames of the frame 410) of the frame 410. A ROI corresponds to a region that encompass a dynamic part, for example, the region 420 (boundary around a flame) in the frame 410 that may change in the succeeding frames of the frame 410. In an embodiment, the ROI may be selected based on a user input. In an embodiment, the user input may be facilitated by one of a mouse click, a touch screen, a user gesture such as a hand gesture, and a user gaze. In an embodiment, the user input for selection of the ROI may be facilitated by means of a user interface, for example, the user interface 206 (refer FIG. 2).

As illustrated in FIG. 4A, the frame 410 is shown to include a person waving his hand. In an embodiment, the waving of the hand is a periodic motion since the to-and-fro motion of the hand about a certain fixed position is repeated. In an embodiment, the periodic motion associated with the movement of the hand of the person may be determined based on the determination of object mobility data matrix followed by projection of the object mobility data matrix on a line.

Referring to FIG. 4B, an object mobility data matrix 430 for the multimedia content comprising the motion of the movement of the hand of the person is illustrated. In an embodiment, the object mobility data matrix 430 may be computed by computing the SAD between the plurality of frames associated with different positions of the waving hand of the person. In an embodiment, the SAD between the plurality of frames (for example a frame 410 and subsequent frames) may be computed for pixels with the ROI, for example the ROI 420. In an embodiment, the SAD may be computed based on the following expression:

$$D(i,j) = \text{SAD}(\text{frame}i, \text{frame}j),$$

where, frame$i$ and frame$j$ are the pixels within the ROI in frames i and j, respectively, and $D(i,j)$ is the distance between the frame$i$ and frame$j$ In an embodiment, the object mobility data matrix 430 may be an N×N matrix, where N is the number of frames in the plurality of frames. In an embodiment, a central line 432 along a diagonal of the object mobility data matrix 430 may be representative of lowest cost line since the line indicates the distance between the same frames (for example, distance of the 65$^{th}$ frame with the 65$^{th}$ frame). In an embodiment, the frames may be represented as a low-cost line in the object mobility data matrix 430. Such frames may be represented as sub-diagonals (for example, sub-diagonals 434 and 436) aligned parallel to one of the main diagonals of the object mobility data matrix 430. In an embodiment, the sub-diagonals 434, 436 may be at located at equal distances from the main diagonal (as illustrated with reference to FIG. 4B).

In an embodiment, the periodicity in the motion is determined based on the projection of the object mobility data matrix 430 on to a line, for example a line 438 orthogonal to the main diagonal of the object mobility data matrix 430. For example, as illustrated in FIG. 4B, a line 438 perpendicular to the main diagonal may be determined, and projection of the object mobility data matrix 430 may be computed on the line 438 since for periodic sequences, the periodicity manifests itself as sub-diagonals in the object mobility data matrix. In an embodiment, a frequency domain analysis may be performed on the projection signal, to robustly estimate whether or not the sequence is periodic, and to determine the duration of the period once the periodic motion is determined.

Referring now to FIG. 4C, a variation illustrating a projection 440 of the object mobility data matrix 430 is illustrated. In an embodiment, the projection 440 of the object mobility data matrix 430 is determined at the line 438 inclined at angle of 45 degrees. In an embodiment, the projection of the object mobility data matrix along 45 degrees inclination is of a length of 2N+1, where N is the number of frames. For example, for a 65 number of frames (as illustrated in FIG. 4B), the length of a projection vector is 131 (as illustrated in FIG. 4C). As illustrated in FIG. 4C, the projection 440 is shown to include alternate peaks and valleys. In an embodiment, the peaks and valleys in the projection 440 are indicative of a periodic motion being represented in the object mobility data matrix. For example, corresponding to a zero SAD value between the frames, the projection 440 may include a valley while for a high SAD value between the frames, the projection 440 may include a peak. In an embodiment, the difference between the two valleys may be representative of a period of the periodic motion.

As discussed with reference to FIG. 3, the motion associated with the ROI is determined to be one of periodic and non-periodic based on a computation of a cepstrum of the projection, for example the projection 440. In an embodiment, the computation of the cepstrum comprises determination of an amplitude and quefrency of the cepstrum. In an embodiment, the motion is periodic when the presence of at least one peak in the computed cepstrum having an amplitude greater than the predetermined threshold amplitude is determined, and when the quefrency is determined to be greater than a predetermined threshold quefrency.

Figure 4D:
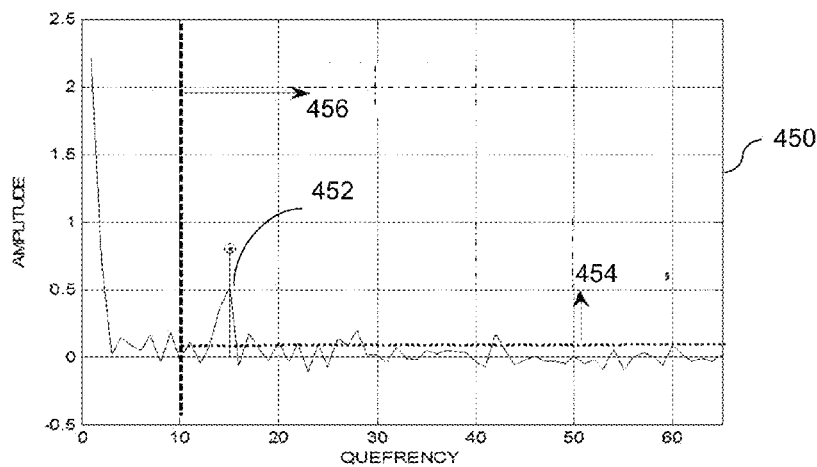

Referring now to FIG. 4D, a cepstrum 450 of the object mobility data matrix 430 is illustrated. As illustrated in FIG. 4D, the cepstrum 450 is shown to include peaks, for example, a peak 452 having an amplitude greater than the predetermined threshold amplitude 454. Additionally, the cepstrum 450 includes a first peak above a certain minimum value of quefrency. Such a value of quefrency may be a predetermined threshold quefrency. In an embodiment, the value of the quefrency above the predetermined threshold quefrency (represented as 456 in FIG. 4D) at which the first peak of the cepstrum appears may correspond to a period of the periodic motion. In an embodiment, the certain minimum value of quefrency above which the quefrency is to be determined may be based on an application of the periodic motion detection. For example, for generation of a meaningful animated image, the plurality of frames may be selected in a manner that the plurality of frames may include at least four periods within it.

In an embodiment, a non-periodicity in the motion of the ROI may also be determined based on the amplitude and quefrency of the cepstrum. An example embodiment illustrating various steps involved in determination of a non-periodic motion are discussed in detail with reference to FIGS. 5A through 5D.

Figure 5A:
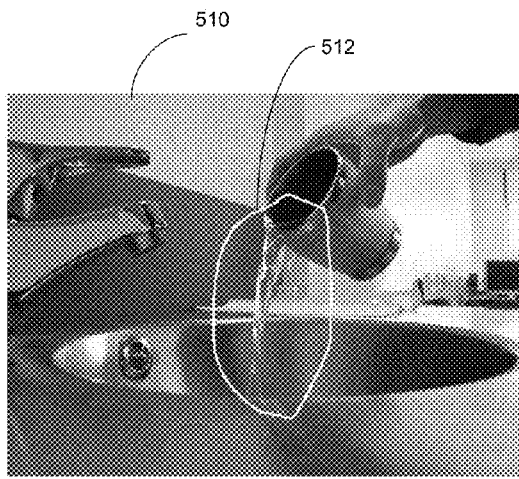
FIGS. 5A, 5B, 5C and 5D illustrate an example representation of steps for determination of a non-periodic motion in a multimedia content, in accordance with an example embodiment.

FIGS. 5A, 5B, 5C and 5D illustrate determination of a non-periodic motion associated with a multimedia content in accordance with an example embodiment. For example, FIG. 5A illustrates frame 510 illustrating water falling from a container. In an embodiment, the frame 510 may be a first frame of a plurality of frames of the multimedia content associated with the scene of water falling from the container. In an embodiment, a ROI 512, for example, the falling water may be selected in the plurality of frames. In an embodiment, the ROI 512 may be selected based on a user action.

Figure 5B:
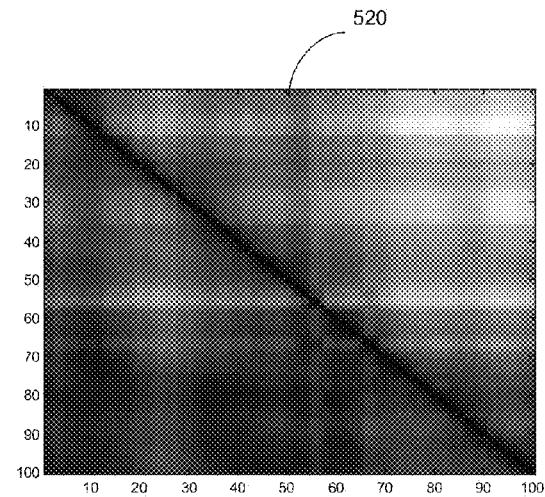
Figure 5C:
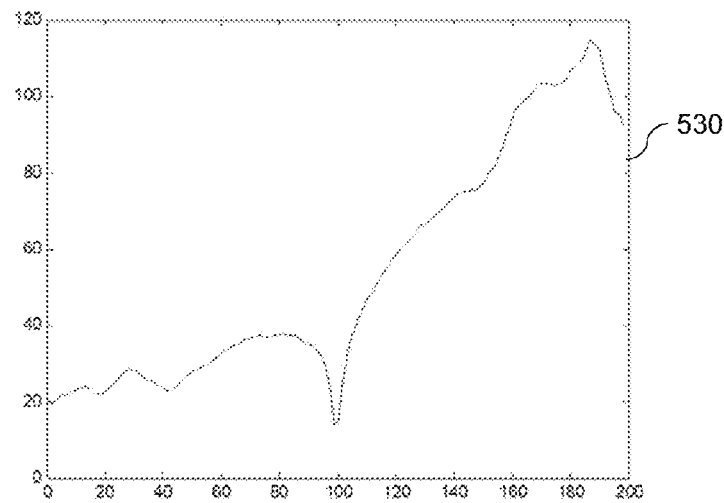
Figure 5D:
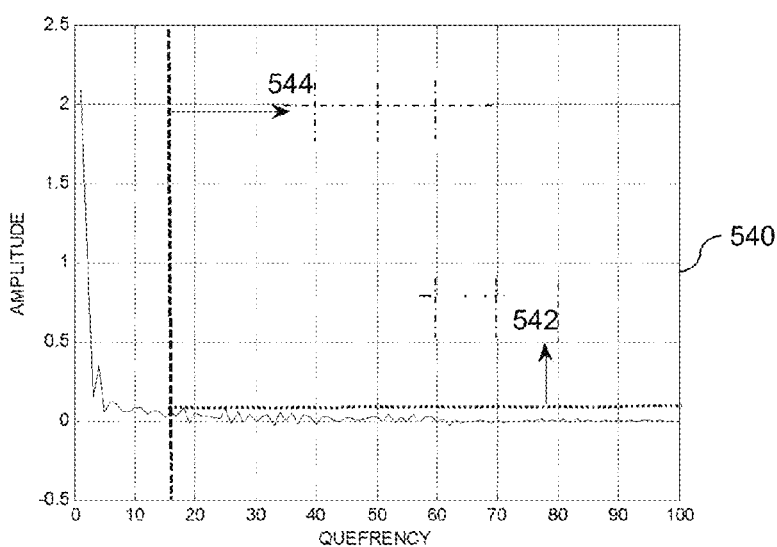

Referring to FIG. 5B, an object mobility data matrix 520 generated for the ROI 512 is illustrated. As already discussed, the object mobility data matrix may be generated based on a determination of SAD between a plurality of frames associated with the ROI. In an embodiment, for a non-periodic motion, the object mobility matrix 520 may include patterns as illustrated in FIG. 5B. In an embodiment, the object mobility matrix 520 may be projected on a line to generate a projection curve, for example, a projection curve 530 illustrated in FIG. 5C. It should be noted that a projection curve 530 corresponding to a non-periodic motion may not include alternate valleys and peaks, unlike a projection curve for a periodic motion (for example, the projection curve 440 illustrated in FIG. 4C). In an embodiment, a cepstrum, for example a cepstrum 540 (refer FIG. 5D) generated for a non-periodic motion may not include a peak having amplitude greater than a predetermined threshold amplitude 542. In an embodiment, the cepstrum 540 generated for a non-periodic motion may not include a peak after a predetermined threshold value of quefrency (for example, the value of quefrency at 544) An example method for determination of periodicity in a multimedia content is described further in detail with reference to FIG. 6.

Figure 6:
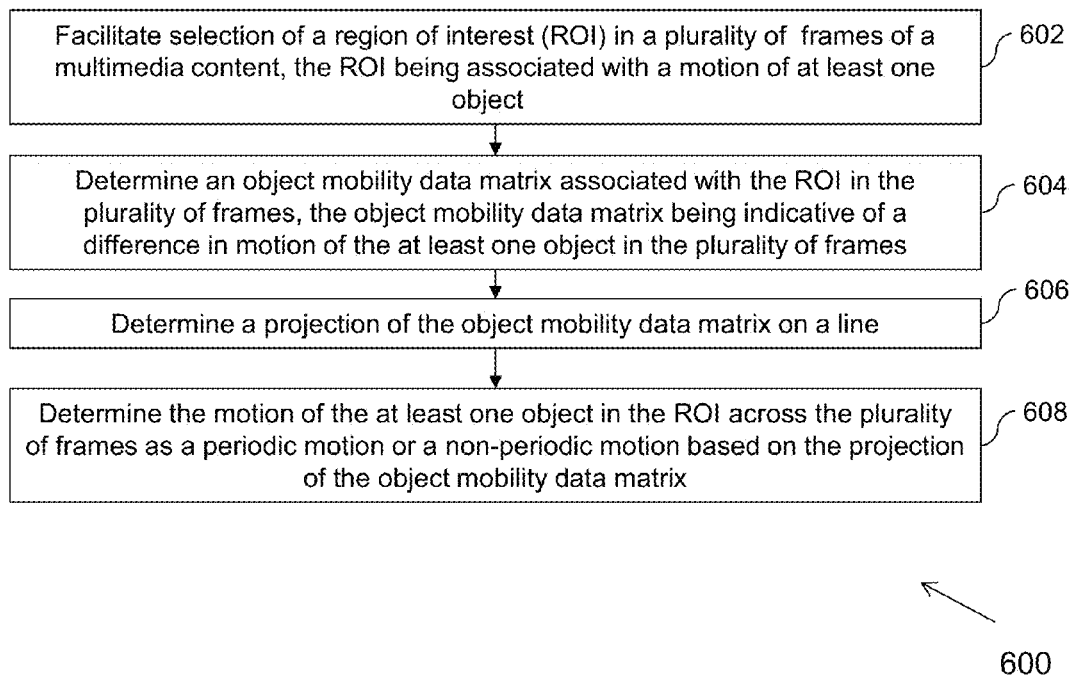
FIG. 6 is a flowchart depicting an example method for detection of periodicity in a multimedia content, in accordance with an example embodiment.

FIG. 6 is a flowchart depicting an example method 600 for determining periodicity of motion in a multimedia content, in accordance with an example embodiment. In various example embodiments, the multimedia content comprises a video content. In an embodiment, the multimedia content comprises a sequence of frames. The method 600 depicted in the flow chart may be executed by, for example, the apparatus 200 of FIG. 2.

At block 602, the method 600 includes facilitating selection of a ROI in a plurality of frames of the multimedia content. In an embodiment, the ROI is associated with a motion of at least one object. In an embodiment, the plurality of frames may be associated with a sequence in the multimedia content. For example, the plurality of frames may include a sequence of waving of a hand (for example, as discussed with reference to FIG. 4A). In an embodiment, the sequence may represent one of a periodic and a non-periodic motion. In an embodiment, the periodic motion may be the one in which an oscillatory motion about a fixed position can be identified. In a sequence represent a non-periodic motion, the motion is not oscillatory about a fixed position, for example, a translational motion in one direction. In order to determine whether the motion included in the ROI is a periodic motion or a non-periodic motion, an object mobility data matrix associated with the ROI is determined in the plurality of frames, at block 604. In an embodiment, the object mobility data matrix is indicative of a difference in motion of the at least one object in the plurality of frames. Examples of object mobility data matrices for a periodic motion and a non-periodic motion respectively are illustrated and explained with reference to FIGS. 4B and 5B, respectively.

At block 606, a projection of the object mobility data matrix is determined on a line. In an embodiment, the line may be orthogonal to a diagonal of the object mobility data matrix. In an embodiment, the motion is a periodic motion, the projection of the object mobility data matrix may include a plurality of peaks and valleys representative of the periodic motion. However, in case of a non-periodic motion, the projection of the object mobility data matrix on the line may not include peaks and valleys. Examples of the projection of the object mobility data matrix on the line orthogonal to the diagonal of the object mobility data matrix for a periodic motion and a non-periodic motion are illustrated and explained with reference to FIGS. 4C and 5C.

At block 608, a motion of the at least one object is determined in the ROI across the plurality of frames based on the projection of the object mobility data matrix. In an embodiment, the periodicity of the motion may be determined by computing a cepstrum. In an embodiment, it may be determined whether at least one peak is present in the computed cepstrum that may have an amplitude greater than a predetermined threshold amplitude. Additionally, it may be determined whether a quefrency at a first peak of the cepstrum is greater than a predetermined threshold quefrency. In an embodiment, based on the determination of the presence of at least one peak in the computed cepstrum having an amplitude greater than the predetermined threshold amplitude, and the quefrency at the first peak greater than the predetermined threshold quefrency, it may be ascertained that the motion of the at least one object is periodic.

If however, it is determined that at least one peak having an amplitude greater than the predetermined threshold amplitude is not present in the computed cepstrum, then the motion of the at least one object may be determined to be non-periodic. Examples of the cepstrum for the periodic motion and the non-periodic motion are illustrated and explained with reference to FIGS. 4D and 5D, respectively. Various example embodiments of detection of periodicity of motion of at least one object of a multimedia content are further described in FIG. 7.

Figure 7:
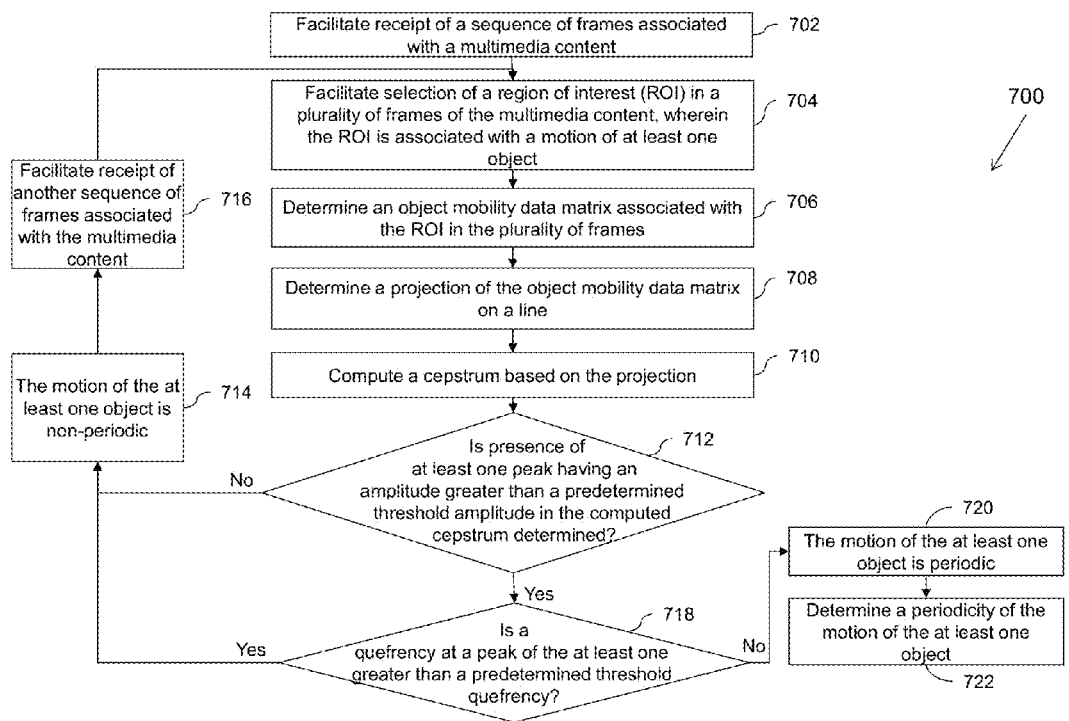
FIG. 7 is a flowchart illustrating another example method for detection of periodicity in a multimedia content, in accordance with another example embodiment.

FIG. 7 is a flowchart depicting example method 700 for determination of periodicity in a multimedia content, in accordance with another example embodiment. The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the methods are described with help of apparatus 200. However, the operations of the methods can be described and/or practiced by using any other apparatus.

At block 702, a receipt of a multimedia content is facilitated. In an embodiment, the multimedia content comprises a sequence of frames depicting a scene. In an embodiment, the multimedia content may be captured by a media capture element, such as a camera module 122 of device 100 or the image sensor 208. The scene may include one or more objects in a surrounding environment of the media capture element, for example, a person or a gathering of individuals, birds, books, a playground, natural scenery, such as a mountain, and the like. In an embodiment, the sequence of frames corresponding to a scene may be captured by an image sensor. In an embodiment, the sequence of frames may be received from an internal memory such as hard drive, random access memory (RAM) or from an external storage medium such as digital versatile disk, compact disk, flash drive, memory card, or from external storage locations through Internet, Bluetooth®, and the like.

At block 704, a selection of a ROI in a plurality of frames of the multimedia content is performed. In an embodiment, the plurality of frames may be selected from among the sequence of frames either automatically or manually by user selection. In an embodiment, a user may provide a selection of the plurality of frames image from among sequence of frames, for example by using a user interface, such as the user interface 206. In an embodiment, the ROI is associated with a motion of at least one object.

At block 706, an object mobility data matrix associated with the ROI is determined in the plurality of frames. Various example object mobility data matrices for a periodic motion and a non-periodic motion are illustrated and explained with reference to FIGS. 4B and 5B, respectively. In an embodiment, the object mobility data matrix is indicative of a difference in motion of the at least one object in the plurality of frames. In an embodiment, the object mobility data matrix may be determined by computing SAD between the frames of the plurality of frames. In an embodiment, on selection of the ROI in the plurality of frames, the object mobility data matrix may be determined by determining the pixels within the ROI such that $D(i,j)=SAD(frame_i, frame_j)$, wherein $frame_i$, $frame_j$ are the pixels within the ROI in frames i and j, respectively. In an example embodiment, if there are N frames, then the object mobility data matrix may be an N×N matrix.

In an embodiment, the difference or disparity between the frames in the object mobility data matrix may be represented as a low-cost line in the object mobility data matrix. In an embodiment, the low-cost line (represented as sub-diagonals) may be aligned along one of the diagonals of the object mobility data matrix. In an embodiment, the sub-diagonals may be parallel to and at equal distance from the main diagonal of the object mobility data matrix. At block 708, a projection of the object mobility data matrix on the line is determined. In an embodiment, when the motion is a periodic motion, the projection of the object mobility data matrix may include a plurality of peaks and valleys representative of the periodic motion. However, in case of a non-periodic motion, the projection of the object mobility data matrix on the line may not include peaks and valleys. Examples of the projection of the object mobility data matrix on a line orthogonal to the diagonal of the object mobility data matrix for a periodic motion and a non-periodic motion are illustrated and described with reference to FIGS. 4C and 5C, respectively.

At block 710, a cepstrum may be computed based on the projection. In an embodiment, the cepstrum may be utilized for determination of whether the motion of the at least one object is periodic or non-periodic. For example, corresponding to a periodic motion, the cepstrum may include at least one peak having an amplitude greater than a predetermined threshold amplitude. At block 712, it is determined whether the computed cepstrum comprises at least one peak having an amplitude greater than the predetermined threshold amplitude. If at block 712, it is determined that the computed cepstrum does not include at least one peak having an amplitude greater than the predetermined threshold amplitude, then it may be determined that the motion of the at least one object is non-periodic, at block 714. The method 700 may further lead to facilitation of receipt of another sequence of frames for determination of the periodicity therein at block 716.

If however, at block 712, it is determined that the computed cepstrum comprises at least one peak having an amplitude greater than the predetermined threshold amplitude, then it is further determined at block 718, whether a quefrency at a peak of the cepstrum associated with the cepstrum is greater than a predetermined threshold quefrency. If it is determined that the value of quefrency at the peak of the cepstrum is not greater than the predetermined threshold quefrency, then at block 714, it is determined that the motion is non-periodic. If however, it is determined that the value of quefrency is greater than the predetermined threshold quefrency, then at block 720, it is determined that the motion is periodic. In an embodiment, on determination of the motion to be periodic, a periodicity of the motion may be determined at block 722. For example, the periodicity of the motion may be determined based on a determination of the value of quefrency at the peak of the cepstrum. In an embodiment, the peak may be a first occurring peak in the computed cepstrum having the amplitude greater than the predetermined threshold amplitude, and the quefrency greater than the predetermined threshold quefrency. In this embodiment, the value of quefrency at the peak may be Qfrency1. In this embodiment, the value of Qfrency1 may be the period of the periodic motion. In another embodiment, the peak may be a peak occurring at a second or third instance or any other instance apart from the first instance at which the amplitude is greater than the predetermined threshold amplitude, and the quefrency is greater than the predetermined threshold quefrency. In this embodiment, the value of quefrency (Qfrency2) at, for example, the second peak may be 2*Qfrency1. In this embodiment, the value of Qfrency2 may be the period of the periodic motion.

To facilitate discussions of the method 700 of FIG. 7, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the method 700 are performed in an automated fashion. These operations involve substantially no interaction with the user. Other operations of the methods 700 may be performed by in a manual fashion or semi-automatic fashion. These operations involve interaction with the user via one or more user interface presentations.

Without in any way limiting the scope, interpretation, or application of the claims appearing below, a technical effect of one or more of the example embodiments disclosed herein is to determined periodicity of motion associated with a multimedia content. Various embodiments provides methods, wherein an object mobility data matrix may be determined for a selected ROI in the multimedia content such that the analysis of the diagonal of object mobility data matrix facilitates in determination of periodicity of motion of the ROI. For example, a cepstrum may be computed by projecting the object mobility data matrix on a line, and presence of spikes in the cepstrum may ascertain the presence of the periodicity in motion. In an embodiment, the analysis of cepstrum for determination of the periodicity provides a robust and an efficient method for periodicity detection in a multimedia content. Moreover, the method facilitates in estimation of a period (or duration) of the motion once it is ascertained that the motion is periodic. In an embodiment, the determination of periodicity facilitates in a variety of applications, for example, generation of an endlessly looping and temporally seamless animated image.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

We claim:
1. A method comprising:
  facilitating selection of a region of interest (ROI) associated with a motion of at least one object in a plurality of frames of a multimedia content is;
  determining, by a processor, an object mobility data matrix associated with the ROI in the plurality of frames, the object mobility data matrix being indicative of a difference in motion of the at least one object in the plurality of frames;
determining a projection of the object mobility data matrix on a line; and
determining the motion of the at least one object in the ROI across the plurality of frames as a periodic motion or a non-periodic motion based on the projection of the object mobility data matrix;
wherein determining the motion comprises:
computing a cepstrum based on the projection; and
determining the motion of the at least one object as the periodic motion based on a presence of at least one peak in the computed cepstrum having an amplitude greater than a predetermined threshold amplitude, and a quefrency greater than a predetermined threshold quefrency.

2. The method as claimed in claim 1, wherein the line is orthogonal to a diagonal of the object mobility data matrix.

3. The method as claimed in claim 1, further comprising determining a period of the motion of the at least one object in the ROI, wherein the period of the motion comprises a value of quefrency at a peak of the at least one peak occurring in the computed cepstrum and having the amplitude greater than the predetermined threshold amplitude, and the quefrency greater than the predetermined threshold quefrency.

4. The method as claimed in claim 1, further comprising determining the motion as the non-periodic motion if the at least one peak having the amplitude greater than the predetermined threshold is not present in the cepstrum.

5. The method as claimed in claim 1, wherein the multimedia content comprises a video content.

6. The method as claimed in claim 1 further comprising generating an animated image associated with the multimedia content based on the selection of the ROI and determination of the period of the motion of the at least one object in the ROI.

7. An apparatus comprising:
at least one processor; and
at least one memory comprising computer program code, the at least one memory and the computer program code configured to, with the at least one processor, cause the apparatus to at least perform:
facilitate selection of a region of interest (ROI) associated with a motion of at least one object in a plurality of frames of a multimedia content;
determine an object mobility data matrix associated with the ROI in the plurality of frames, the object mobility data matrix being indicative of a difference in motion of the at least one object in the plurality of frames;
determine a projection of the object mobility data matrix on a line; and
determine the motion of the at least one object in the ROI across the plurality of frames as a periodic motion or a non-periodic motion based on the projection of the object mobility data matrix;
wherein determining the motion comprises:
compute a cepstrum based on the projection; and
determine the motion of the at least one object as the periodic motion based on a presence of at least one peak in the computed cepstrum having an amplitude greater than a predetermined threshold amplitude, and a quefrency greater than a predetermined threshold quefrency.

8. The apparatus as claimed in claim 7, wherein the line is orthogonal to a diagonal of the object mobility data matrix.

9. The apparatus as claimed in claim 7, wherein the apparatus is further caused, at least in part to determine a period of the motion of the at least one object in the ROI, wherein the period of the motion comprises a value of quefrency at a peak of the at least one peak occurring in the computed cepstrum and having the amplitude greater than the predetermined threshold amplitude, and the quefrency greater than the predetermined threshold quefrency.

10. The apparatus as claimed in claim 7, wherein the apparatus is further caused, at least in part to determine the motion as the non-periodic motion if the at least one peak having the amplitude greater than the predetermined threshold is not present in the cepstrum.

11. The apparatus as claimed in claim 7, wherein the multimedia content comprises a video content.

12. The apparatus as claimed in claim 7, wherein the apparatus is further caused, at least in part to generate an animated image associated with the multimedia content based on the selection of the ROI and determination of the period of the motion of the at least one object in the ROI.

13. A non-transitory computer readable medium comprising a set of instructions, which, when executed by one or more processors, cause an apparatus to at least perform:
facilitate selection of a region of interest (ROI) associated with a motion of at least one object in a plurality of frames of a multimedia content;
determine an object mobility data matrix associated with the ROI in the plurality of frames, the object mobility data matrix being indicative of a difference in motion of the at least one object in the plurality of frames;
determine a projection of the object mobility data matrix on a line; and
determine the motion of the at least one object in the ROI across the plurality of frames as a periodic motion or a non-periodic motion based on the projection of the object mobility data matrix;
wherein determining the motion comprises:
compute a cepstrum based on the projection; and
determine the motion of the at least one object as the periodic motion based on a presence of at least one peak in the computed cepstrum having an amplitude greater than a predetermined threshold amplitude, and a quefrency greater than a predetermined threshold quefrency.

14. The non-transitory computer readable medium as claimed in claim 13, wherein the line is orthogonal to a diagonal of the object mobility data matrix.

15. The non-transitory computer readable medium as claimed in claim 13, wherein the apparatus is further caused, at least in part to determine a period of the motion of the at least one object in the ROI, wherein the period of the motion comprises a value of quefrency at a peak of the at least one peak occurring in the computed cepstrum and having the amplitude greater than the predetermined threshold amplitude, and the quefrency greater than the predetermined threshold quefrency.

16. The non-transitory computer readable medium as claimed in claim 13, wherein the apparatus is further caused, at least in part to determine the motion as the non-periodic motion if the at least one peak having the amplitude greater than the predetermined threshold is not present in the cepstrum.

17. The non-transitory computer readable medium as claimed in claim 13, wherein the apparatus is further caused, at least in part to generate an animated image associated with the multimedia content based on the selection of the ROI and determination of the period of the motion of the at least one object in the ROI.

\* \* \* \* \*